United States Patent [19]
Beller

[11] Patent Number: 5,621,518
[45] Date of Patent: Apr. 15, 1997

[54] OPTICAL TIME DOMAIN REFLECTOMETER (OTDR) WITH IMPROVED DYNAMIC RANGE AND LINEARITY

[75] Inventor: Josef Beller, Hildrizhausen, Germany

[73] Assignee: Hewlett-Packard Company, Palo Alto, Calif.

[21] Appl. No.: 540,903

[22] Filed: Oct. 10, 1995

[30] Foreign Application Priority Data

Nov. 26, 1994 [EP] European Pat. Off. ............... 94118620

[51] Int. Cl.⁶ ................................................. G01N 21/88
[52] U.S. Cl. ............................................... 356/73.1
[58] Field of Search .................................... 356/73.1

[56] References Cited

U.S. PATENT DOCUMENTS 4,928,232  5/1990  Gentile ................................. 356/73.1

OTHER PUBLICATIONS

The Transactions of the IECE of Japan, vol. E67, No. 9, Sep. 1984, Tokyo, Japan, T. Horiguchi et al 'Optical Time Domain Reflectometer for Single–Mode Fibers', pp. 509, 510, 512 and 514.

Electronics and Communications in Japan—Part I: Communications, vol. 75, No. 12, Dec. 1992 New York (US), S. Furukawa et al 'Enhancement of OTDR Performance with an Optical Fiber Amplifier', pp. 76, 78, 80, 82, 84, 86.

European Search Report—Apr. 18, 1995.

*Primary Examiner*—Vincent P. McGraw

[57] ABSTRACT

This invention relates to a method and an apparatus for performing exceptionally linear averaging of digitized signals in an optical time domain reflectometer. Resolutions far below the quantization level of the ADC with improved linearity can be achieved without sacrificing dynamic range. Such method can be used to improve measurement accuracy on optical fibers under test.

12 Claims, 3 Drawing Sheets

OPTICAL TIME DOMAIN REFLECTOMETER (OTDR) WITH IMPROVED DYNAMIC RANGE AND LINEARITY

FIELD OF THE INVENTION

This invention relates to a test equipment in the field of optical communication networks and, more particularly, to an optical time domain reflectometer and a method for testing optical devices, such as optical fibers.

BACKGROUND OF THE INVENTION

Optical time domain reflectometers(OTDR) and methods for the test of optical components, such as optical fibers, are commonly used in optical communication systems. In practice there is a need for the characterization of an optical fiber's attenuation, uniformity, splice loss, breaks and length. In a known OTDR arrangement a pulse generator drives a laser diode which then launches optical pulses (10 mW or more) into an optical fiber to be tested. The pulse width ranges from nanoseconds to microseconds at repetition rates of 1 kHz (for long fiber lengths) up to 20 kHz (for short fiber lengths). The repetition rate is chosen such that the signals returning from the optical fiber do not overlap. The returning signal is separated from the launched signal by a directional coupler, such as a twisted-pair coupler or a polarizing beam splitter. Often an avalanche photodiode is used as a detector or OTDR receiver. Its signal is fed to an amplifier and a digitizer. A box car averager usually improves the signal-to-noise ratio. The signal is then displayed in logarithmic form. The weakness of the signals back-scattered by an optical component under test requires signal processing. In OTDRs this is commonly done in the digital data domain. Digital data is obtained by use of analog-to-digital converters (ADC) which convert analog signals into binary codes representing quantized amplitude values closest to the input value. As the conversion is not instantaneous, the output of an ADC is a discrete-time data sequence. Thus, theorems related to periodic sampling apply to the ADC output data as disclosed e.g. in A. V. Oppenheim, R. W. Schafer: Discrete-Time Signal Processing; Prentice Hall, New Jersey 1989.

As a consequence, in general the digital data is different from the true analog data. The amplitude difference is called quantization error. This quantization error leads to hard deterioration of measurement results in OTDRs and limits the lowest signal level which can be measured.

E.g. from F. Sischka, S. A. Newton, M. Nazarathy: Complementary Correlation Optical Time-Domain Reflectometry; Hewlett-Packard Journal, December 1988 it is known to add a dither signal to the analog input of the ADC to decrease the quantization error if a couple of individual measurements were taken and an average is calculated out of the digital results. After sufficient averaging is done, the well-known sawtooth error function of the ADC is smoothed to a sine function with drastically reduced amplitude. Such an averaging process implemented in all common OTDRs has two benefits. First, the quantization error is reduced, and second, the signal-to-noise ratio of the measurement result increases, as disclosed e.g. in J. Beller: A High-Performance Signal Processing System for the HP8146A Optical Time Domain Reflectometer; Hewlett-Packard Journal, February 1993.

Commonly, the electronic circuit of an OTDR receiver generates a certain amount of noise that is used in standard OTDRs to act as the dither signal already mentioned. An amplifier is used to scale the noise level at the ADC input to an appropriate level, with regard to the quantization step of the ADC. A high gain leads to a large noise amplitude which avoids a quantization error and results in improved linearity. However, as signal plus noise is amplified, high gain also limits the ADC's conversion range, i.e. clipping occurs at lower signal levels than it will be the case with lower gain. Hence, signal conversion of an ADC is limited by the maximum level on the upper side and the noise level on the lower side. Therefore, the noise level has an impact on both, the signal-to-noise ratio (dynamic range of measurement result) and linearity. This trade-off forces designers to a compromise regarding improved dynamic range and good linearity.

Thus, there is a need for an optical time domain reflectometer (OTDR) and a method for testing optical components, such as optical fibers, comprising a wide dynamic range and good linearity.

SUMMARY OF THE INVENTION

The present invention relates to an optical time domain reflectometer (OTDR) and a method for time domain reflectometry.

Basically, an optical time domain reflectometer according to the invention comprises:

- a pulse generator launching optical pulses into an optical component under test having a pulse widths range from nanoseconds to microseconds at repetition rates typically in the range of 0.1 to 50 kHz,
- a receiver, such as an avalanche photo diode detector, with a specific band width, receiving a backscatter signal of said optical component under test and generating a first electrical signal of said backscatter signal and a first noise signal,
- an amplifier amplifying said first electrical signal and said first noise signal,
- a noise source generating a second noise signal being superposed with the amplified first electrical signal and the amplified first noise signal,
- an analog-digital-converter (ADC) with a sampling frequency $f_S$ having means for converting the superposed signals to first digital data and having means for averaging and
- means for digital-signal-processing said first digital data.

It is the core of the invention to generate an additional noise signal and to superpose the additional noise signal with the amplified electrical signal generated by the OTDR receiver before it is converted by an analog-to-digital converter. The additional noise signal is generated by a noise source having an independently setable amplitude level and the total noise level at the input of the analog-to-digital converter is adjusted to arms value of $\sigma \approx 1$. If the noise level is independently adjustable and not amplified together with the OTDR receiver signal, an improved dynamic range in combination with a good linearity can be obtained.

According to a first embodiment of the invention the OTDR comprises a bandpass, filtering the second noise signal generated by the additional noise source. The filtered signal is superposed with the amplified electrical signal of the OTDR receiver converting the optical backscatter signals of the optical component under test into electrical signals. The bandpass allows to add a certain additional noise signal to the amplified measured and noise signal of the OTDR-receiver in order to be able to remove the additional noise signal easily after A/D conversion.

According to a second embodiment of the invention the additional noise signal comprises a center frequency around $f_c = f_{S/2}$, particularly a gaussian distributed and band limited dither signal. In practice, optimal results were obtained when the bandpass center frequency $f_C$ is set to $f_{S/2}$ because of aliasing and spectral frequency periodicity due to time discrete data. With this design rule almost no residual noise contribution falls into the receiver passband, and therefore the signal-to-noise ratio is not decreased.

According to a third embodiment of the invention the means for digital-signal-processing comprise means for removing the digital data due to the additional noise signal. Particularly, a software implemented lowpass is used for removing.

According to a fourth embodiment of the invention an ADC is used which has a sampling frequency $f_S$ which is significantly higher than the bandwidth of the receiver converting the optical backscatter signal of the optical component under test into an electrical signal. This allows to remove the additional noise later on after the conversion process in a simple manner.

According to a fifth embodiment of the invention a lowpass is used for removing the digital data due to the additional noise signal comprising a corner frequency positioned above the bandwidth of the OTDR-receiver and sufficiently below the passband of the bandpass for the additional noise signal. Such a lowpass removes all spectral components above its corner frequency, It will be understood that the mentioned core of the invention is not limited to OTDR applications but can be used to improve accuracy and linearity of analog to digital converters.

It is understood and expressly noted that the present invention relates to all useful and novel combinations of the above disclosed features, whether alone or in any other arbitrary combination. Furthermore, all cited advantages can be seen as objects solved by the invention in its entirety.

BRIEF DESCRIPTION OF THE DRAWINGS

For better understanding the present invention, together with other and further objects, advantages and capabilities thereof, reference is made to the accompanying drawings, which are incorporated herein by reference and in which:

FIG. 1 shows the signal path of the electrical signal generated by an OTDR receiver 101, The conventional signal path comprises an OTDR receiver 101, an amplifier 102, an analog-digital-converter 103 and a digital-signal-processor 104. The analog-digital-converter is driven by a clock 105. An OTDR according to the invention comprises additionally a noise source 106, a bandpass 107, an adder 108 and a digital lowpass 109 as shown under the dotted line in FIG. 1.

Figure 1:
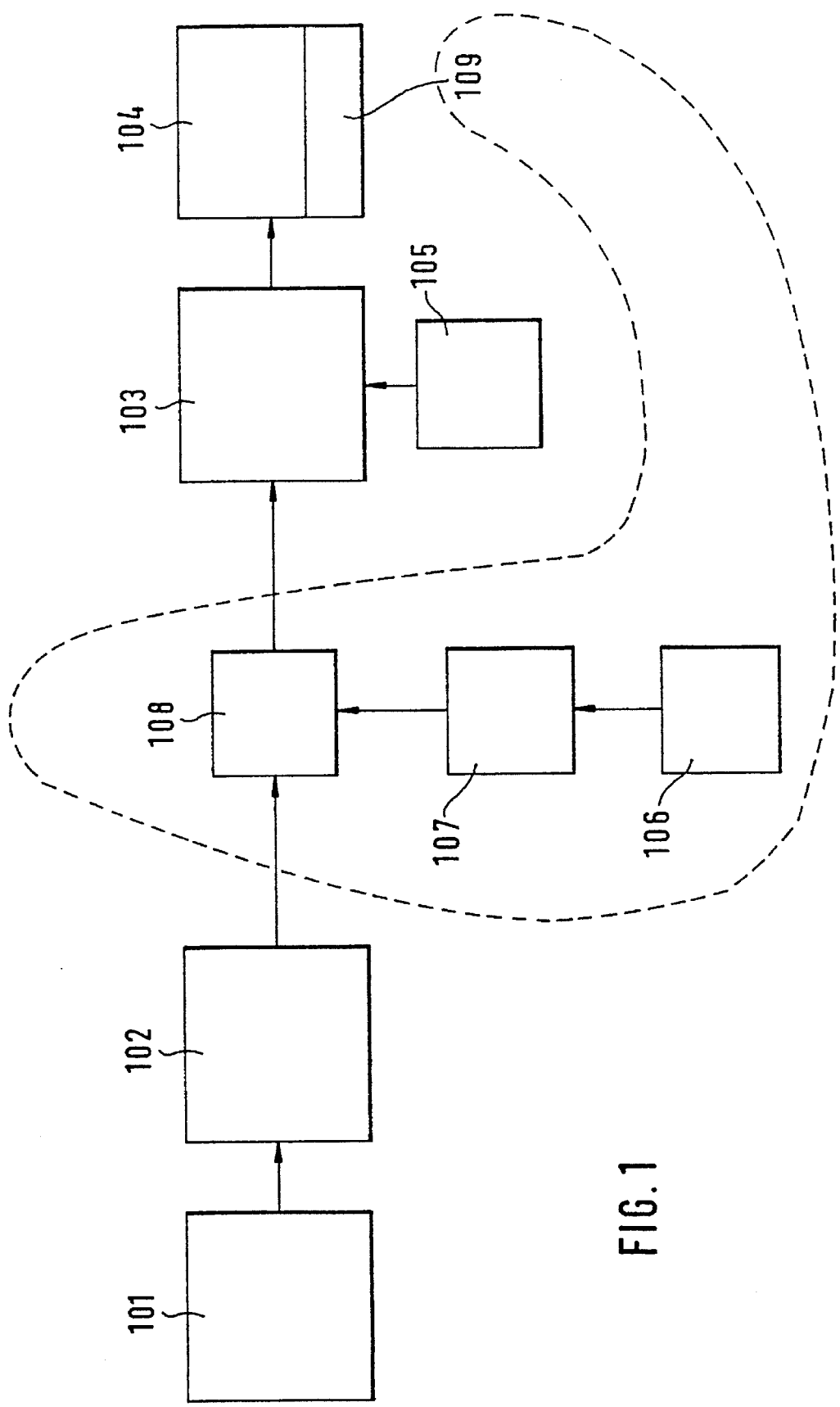
FIG. 1 is a block diagram of the signal path of a conventional and an improved OTDR.

The backscatter signal of an optical fiber under test is applied to the input of the OTDR receiver 101, such as a photo detector comprising an avalanche photo diode. The OTDR receiver 101 converts the optical backscatter signal to a first electrical signal and generates a first noise signal. The first electrical signal and the first noise signal is amplified by an amplifier 102. The output signal of the amplifier 102 is applied to the first input of an adder 108. The noise source 106 generates a second noise signal and its amplitude level is independently adjustable. The second noise signal generated by the noise source 106 is applied to the input of the bandpass 107 which has a center frequency $f_C$ around the half of the sampling frequency $f_S$ of the analog-digital-converter (ADC) 103, i.e. $f_C = f_{S/2}$. At the output of the bandpass 107 a first filtered signal is generated having a center frequency $f_C = f_{S/2}$ and being a gaussian distributed and bandlimited dither signal. The first filtered signal is then applied to the second input of the adder 108. At the output of the adder 108 the amplified first electrical signal, the amplified first noise signal and the first filtered signal is superposed. To be able to simply get rid of this additional noise later on after the conversion process executed by the ADC 103, an ADC with a sampling rate $f_C$ significantly higher than the OTDR receiver bandwidth is selected. In comparison with the conventional signal path, the gain of the amplifier 102 is kept low leading to a higher clipping level of the ADC 103 and therefore leading to an increased ADC conversion range. The total noise level at the ADC input results from the two independent noise sources 101 and 106/107. For good linearity the total noise level of the first noise signal generated by the receiver 101 and the second noise signal generated by the noise source 106 is adjusted to arms value of $\sigma \approx 1$ (the rms value $\sigma \approx 1$ corresponds to the quantization step of the ADC 103). The rms value $\sigma$ determines the residual linearity error after an infinite number of averages.

The analog-digital-converter 103 converts the superposed signals to a discrete time dependent signal which is processed by the digital-signal-processor 104. The processed signal is applied to the lowpass 109 with a corner frequency positioned above the receiver bandwidth and sufficiently below the passband of the bandpass 107 removing all spectral components above its corner frequency. For reasons of convenience the lowpass 109 is implemented as a software filter.

Figure 2:
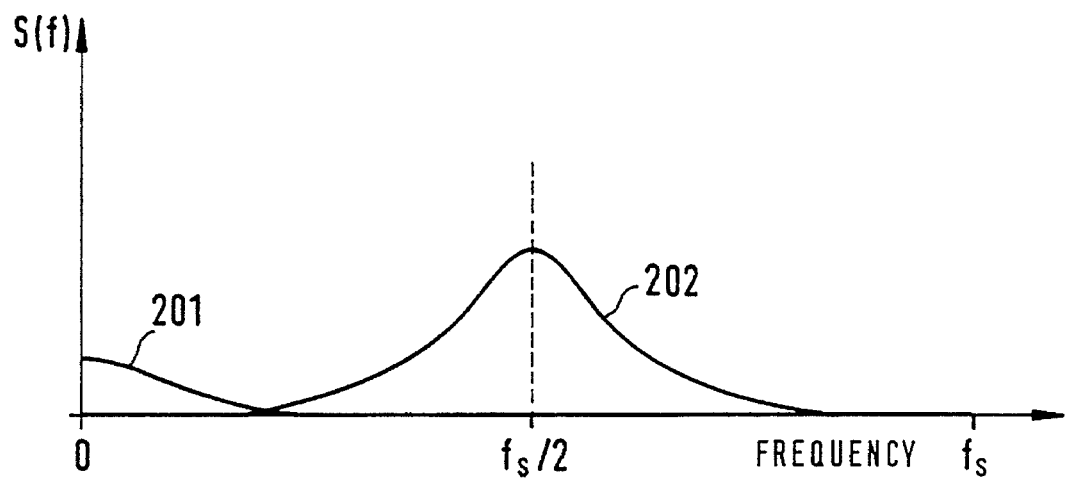
FIG. 2 shows the power spectrum of the noise signals at the ADC input in FIG. 1.

FIG. 2 shows the power of the noise signals at the ADC input versus frequency. The receiver noise is indicated as 201 and the first filtered signal is indicated as 202. The first filtered signal 202 is a gaussian distributed and bandlimited dither signal having a center frequency around $f_C = f_{S/2}$. A high sampling frequency $f_S$ of the ADC 103 opens a frequency span wide enough to allow for the frequency bandlimited additional noise source 106/107 without leading to too much overlap of the spectrums. This also lowers the amount of quantization noise added to the digitized data, since the quantization noise is spread over a broader frequency band.

Figure 3:
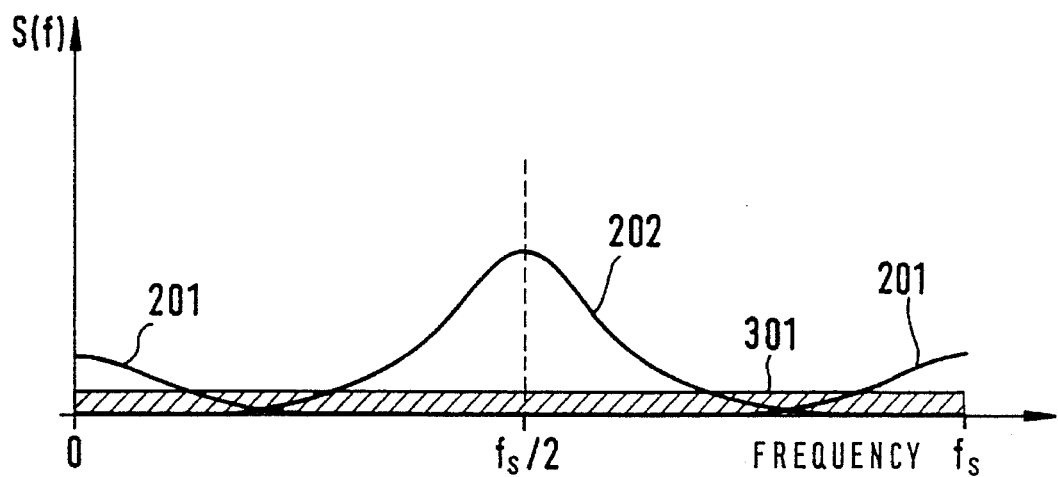
FIG. 3 depicts the power spectrum of the noise signals at the ADC output i FIG. 1.

FIG. 3 shows the power spectrum of the noise signals at the ADC output. The ADC output comprises additionally to the power spectrum of the noise signals at the ADC input a quantization noise signal 301 and the receiver noise 201 centered at the frequency $f_S$ due to the conversion of the ADC 103.

Figure 4:
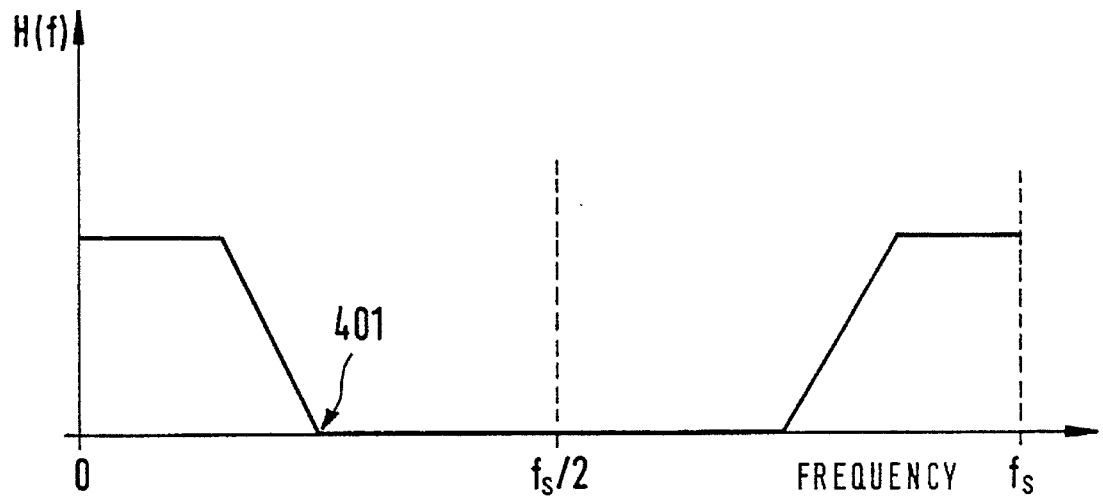
FIG. 4 depicts the transfer function of the digital lowpass in FIG. 1.
Figure 5:
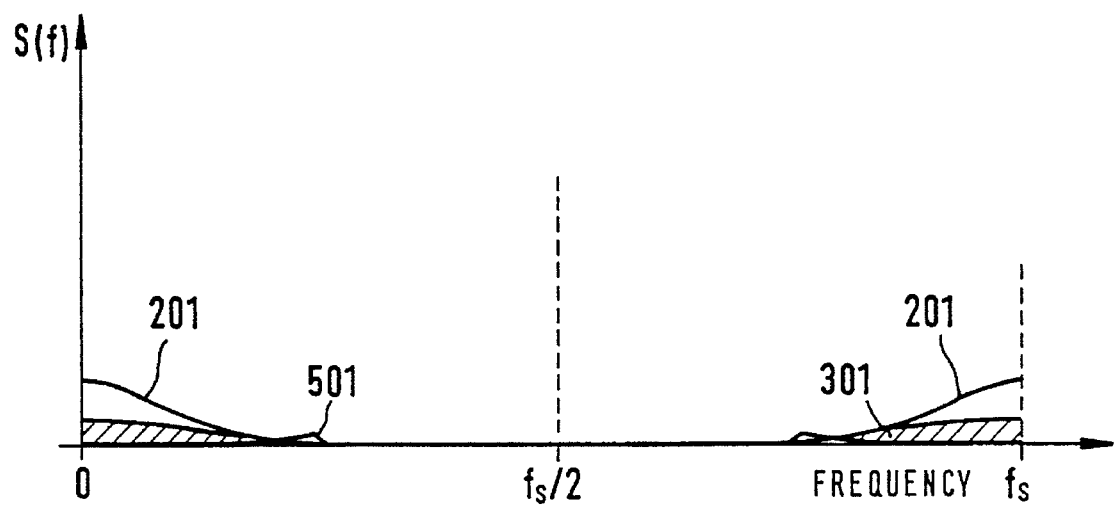
FIG. 5 shows the power spectrum of residual noise after processing in FIG. 1.

FIG. 4 depicts the transfer function of the digital lowpass 109. The lowpass 109 with a corner frequency (indicated as 401) positioned above the receiver bandwidth and sufficiently below the passband of the filter 107 removes all spectral components above its corner frequency as indicated in FIG. 5. A comparison of FIG. 5 with FIG. 3 (noise at ADC output) shows that only a very small residual amount 501 from the noise source 106/107 remains after the filter process by lowpass 109. For optimal results a bandpass center frequency $f_C$ is set to $f_{S/2}$ because of aliasing and spectral frequency periodicity due to time discrete data. With this design rule almost no residual noise contribution falls into the receiver passband, and therefore does not decrease the signal-to-noise ratio. In practical test setups no degradation due to the additional noise source could be measured if the center frequency $f_C$ was aligned to half of the sampling rate. Setting the total noise level at the ADC input sufficiently high ($\sigma \geq 1$) the data averaging process leads to improved signal resolution below the quantization level of the ADC with improved linearity.

I claim:

1. An optical time-domain-reflectometer (OTDR), comprising:

a pulse generator for launching optical pulses into an optical component under test, said pulses exhibiting pulse widths in a range of nanoseconds to microseconds and being launched at repetition rates in a range of about 0.1 to 50 kHz, a receiver, such as an avalanche photodiode detector, with a specific bandwidth, for receiving a backscatter signal of said optical component under test and for generating a first electrical signal representative of said backscatter signal and a first noise signal, an amplifier for amplifying said first electrical signal and said first noise signal, noise source means for generating a second noise signal and combining said first electrical signal and first noise signal, after amplification thereof by said amplifier, with said second noise signal, and outputting combined signals, an analog-digital-converter (ADC) with a sampling frequency $f_S$ for converting the combined signals to first digital data, and means for averaging said first digital data and for removing digital data corresponding to said second noise signal.

2. An OTDR according to claim 1, comprising a first bandpass filter with a passband to filter said second noise signal and for generating a first filtered signal for combination with the first amplified electrical signal and the first amplified noise signal.

3. An OTDR according to claim 2, wherein said first bandpass filter has a center frequency around $f_c = f_{s/2}$.

4. An OTDR according to claim 2, wherein said first filtered signal exhibits a gaussian distribution and/or is a bandlimited signal.

5. An OTDR according to claim 1, further comprising a lowpass filter for removing digital data corresponding to said second noise signal.

6. An OTDR according to claim 5, wherein said lowpass filter is a software implemented lowpass filter.

7. An OTDR according to claim 1, wherein said sampling frequency $f_S$ of said ADC is significantly higher than said bandwidth of said receiver in order to remove the second noise signal after A/D conversion and without affecting said first electrical signal.

8. An OTDR according to claim 1, wherein said noise source has an independently adjustable amplitude level.

9. An OTDR according to claim 5, further comprising:

a first bandpass filter with a passband to filter said second noise signal and for generating a first filtered signal for combination with the first amplified electrical signal and the first amplified noise signal; and wherein said lowpass filter manifests a corner frequency positioned above said bandwidth of said receiver and below said passband of said first bandpass filter.

10. An OTDR according to claim 8, wherein said independently adjustable amplitude level of said noise source is set to a level that the total amplitude level of said first and said second noise signal at the input of said ADC has a root-mean-square (rms) value of $\sigma \approx 1$.

11. Method for time domain reflectometry, comprising:

a first step in which an optical backscatter signal of an optical component under test is received and a first electrical signal representative of said backscatter signal and a first noise signal are generated, a second step in which said first electrical signal and said first noise signal are amplified, a third step in which a second noise signal is generated and superposed with the amplified first electrical signal and the amplified first noise signal, a fourth step in which the superposed signals are sampled at a frequency $f_S$, and are converted to first digital data, a fifth step in which said first digital data is averaged, and thereafter a sixth step in which digital data corresponding to said second noise signal is removed from said first digital data.

12. Method according to claim 11, wherein said second noise signal has a center frequency $f_C$ around $f_C = f_{s/2}$.

* * * * *